Patented Nov. 10, 1936

2,060,195

UNITED STATES PATENT OFFICE 2,060,195

PRODUCTION OF ACID ANHYDRIDES

Stefan Goldschmidt and Rudolf R. Wolff, Karlsruhe, Germany, assignors to The Kessler Chemical Corporation, Orange, N. J., a corporation of Maryland No Drawing. Application July 27, 1932, Serial No. 625,193. In Germany August 8, 1931

13 Claims. (Cl. 260—123)

The invention relates to a process for the production of anhydrides and, more particularly, for the production of organic acid anhydrides and includes correlated improvements and discoveries whereby the preparation of these anhydrides may be enhanced.

It is an object of the invention to provide a process for the production of acid anhydrides in accordance with which the reaction times are decreased and the yields increased.

Further, it is an object of the invention to provide a process whereby organic acid anhydrides may be produced more readily, efficiently, and with greater yields on a commercial scale than heretofore.

Another object of the invention is to provide a process for the production of organic acid anhydrides in which an organic acid and an organic acid chloride are reacted in the presence of a salt as a catalytic agent.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention organic acid anhydrides may be produced by reacting a mixture of a halogen-free organic acid and an acid chloride, especially a non-halogenated organic acid chloride in the presence of a salt of a metal as a catalytic agent. The reaction is facilitated by the addition of only small amounts of such a salt or salts and thereby the evolution of hydrochloric acid is markedly increased so that the reaction time is decidedly reduced and the yields obtained approach the theoretical. Salts of organic acids may be used to accelerate the reaction and, in addition, other salts of metals may also be used. We have found that the reaction is effected and its speed increased by the use of a considerable variety of salts, for example, salts of the alkali metals, of the alkaline earth metals, and of the heavy metals such, for example, as sodium nitrate, calcium chloride, calcium silicate, aluminum chloride, iron sulfide, ferric chloride, aluminum butyrate, calcium butyrate, aluminum benzoate, and calcium propionate. The formation of the salts of organic acids may, if desired, take place in the reaction mixture by adding thereto an oxide or a hydroxide of the desired metal. It is desirable when a salt of an organic acid is used to use the salt corresponding to the acid anhydride being produced.

Further, the invention may be practiced, contrary to statements in literature and with excellent yields of the organic acid anhydrides, by reacting an organic acid with a chloride of phosphorus, e. g., phosphorus trichloride. In this procedure the reaction is carried out in the presence of the catalytically acting salts above mentioned at an elevated temperature in the liquid phase and in a single reaction step. Thus, by heating butyric acid with phosphorus trichloride in the presence of a salt, for example aluminum chloride, butyric anhydride is produced in high yield and in a relatively short time. The salts of the metallic elements which catalyze the reaction may be separated from the reaction mixture when the same is completed, and repeatedly utilized.

As an illustrative embodiment of a manner in which the invention may be practiced, the following examples are given. The parts are by weight.

Example I

A mixture containing 44 parts butyric acid, 53 parts butyryl chloride and 1 part aluminum chloride is heated gently under reflux until the temperature rises to about 182° C. The heating is continued until active evolution of hydrochloric acid ceases. The reaction will be substantially complete in about two hours. Thereafter, the aluminum butyrate formed may be separated from the reaction mixture by filtering and utilized for a subsequent operation. The butyric anhydride contained in the filtrate is obtained therefrom by distillation under vacuum. The yield was found to be about 88–90% of the theoretical.

Example II

An admixture containing 88 parts butyric acid, 27.5 parts phosphorus trichloride and 2 parts of previously used aluminum butyrate is heated for about three hours, as described in Example I. It is desirable to remove the lower layer of the reaction mixture, which consists of phosphorous acid formed during the course of the reaction, from time to time, or at least when the reaction is nearing completion. The upper layer contains the butyric anhydride and the catalyst and is further treated as set forth in Example I. The yield was found to be about 89% of the theoretical.

Example III

The reaction may be carried out as set forth in Example II with the exception that calcium butyrate is utilized as a catalytic agent instead of aluminum butyrate.

Example IV

A mixture containing 30 parts benzoic acid, 30 parts benzoyl chloride, and 1 part of aluminum benzoate is heated according to Example I. The temperature of the reaction mixture at the completion of the reaction in this case may be about 316° C. The benzoic anhydride may then be taken up in chloroform and the reaction was found to yield about 68% of the theoretical.

Example V 60 parts of glacial acetic acid and 27.5 parts phosphorus trichloride are reacted in the presence of 1 part of aluminum chloride by heating for about 2¼ hours according to the procedure in Example II. The acetic anhydride produced may be purified by distillation under a vacuum.

Example VI 33.5 parts oleic acid and 9.3 parts phosphorus trichloride are reacted in the presence of about 0.1 part calcium silicate by heating gently for about ten minutes. The beginning of the reaction may be recognized by a marked rise in temperature which may in ten minutes increase to about 332° C. The reaction may be moderated by cooling or by adding the phosphorus trichloride gradually. The acid anhydride resulting may be purified by distillation under vacuum, and was found to have a boiling point within the range of 200–215° C. at 11 mm.

Example VII

An equimolecular mixture of adipic acid and adipic acid chloride is carefully heated in the presence of 0.005 to 0.01 mole aluminum chloride until evolution of hydrochloric acid ceases. The anhydride produced may be separated from the reaction mixture by extraction with benzol.

The foregoing procedures may be readily and efficiently carried out on a commercial scale and result in high yields of the acid anhydrides. As above indicated, the reaction times, when using a salt as a catalytic agent, are materially reduced. Thus, for example, reaction between one mole butyric acid and one mole butyryl chloride in the absence of a salt required 9 hours and gave a yield of 70%, whereas reacting these materials in the presence of 1/180th mole of calcium silicate required only 2 hours and gave a yield of 80–90% of the theoretical. A similar effect was also noticed in the reaction between butyric acid and phosphorus trichloride. Without a salt it required 9 hours and the yield was 25%. With a small amount of potassium nitrate a 60% yield was obtained in 4 hours. We have found that slightly larger additions of the salts effect a further reduction in the reaction time. Also, the yield when using a small amount of catalyst continues to increase when the heating is prolonged. It will be understood that an admixture of one or more of the salts which act to accelerate the reaction may be utilized in the place of a single catalytic material or a salt.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A process for the production of organic acid anhydrides, which comprises reacting a halogen-free carboxylic acid and a non-halogenated carboxylic acid chloride in the presence of a small amount of a salt of a metal as a catalytic agent.

2. A process for the production of organic acid anhydrides, which comprises reacting a halogen-free carboxylic acid and a non-halogenated carboxylic acid chloride in the presence of a salt of a metal as a catalytic agent at a temperature above atmospheric.

3. A process for the production of organic acid anhydrides which comprises reacting a halogen-free carboxylic acid and a non-halogenated carboxylic acid chloride in liquid phase at a temperature above atmospheric in the presence of a salt of a metal as a catalytic agent.

4. A process for the production of organic acid anhydrides which comprises reacting a halogen-free carboxylic acid and a non-halogenated carboxylic acid chloride in the presence of a salt of a metal as a catalytic agent.

5. A process for the production of organic acid anhydrides, which comprises reacting a halogen-free carboxylic acid and a non-halogenated carboxylic acid chloride at a temperature above atmospheric in the presence of a small amount of a salt of a metal.

6. A process for the production of organic acid anhydrides, which comprises reacting a halogen-free carboxylic acid and a non-halogenated carboxylic acid chloride at a temperature above atmospheric in the presence of a salt of a heavy metal as a catalytic agent.

7. A process for the production of organic acid anhydrides, which comprises reacting carboxylic acid with a non-halogenated carboxylic acid chloride at a temperature above atmospheric in the presence of a small amount of aluminum chloride.

8. A process for the production of butyric anhydride, which comprises reacting butyric acid and a non-halogenated carboxylic acid chloride at a temperature above atmospheric in the presence of a small amount of a salt of a metal as a catalytic agent.

9. A process for the production of butyric anhydride, which comprises reacting butyric acid and butyric chloride at a temperature of about 182° C. in the presence of a small amount of aluminum chloride.

10. A process for the production of organic acid anhydrides, which comprises reacting a halogen-free carboxylic acid and a non-halogenated carboxylic acid chloride in a single reaction step in liquid phase at a temperature above atmospheric and in the presence of a small amount of a salt of a metal as a catalytic agent.

11. A process for the production of organic acid anhydrides, which comprises reacting a halogen-free carboxylic acid and phosphorus trichloride in a single reaction step in liquid phase at a temperature above atmospheric and in the presence of a small amount of a salt of a metal as a catalytic agent.

12. A process for the production of organic acid anhydrides, which comprises reacting a halogen-free carboxylic acid and a non-halogenated carboxylic acid chloride in the presence of a small amount of a salt of a corresponding carboxylic acid as a catalytic agent.

13. A process for the production of organic acid anhydrides, which comprises reacting a halogen-free carboxylic acid and a corresponding non-halogenated carboxylic acid chloride in the presence of a salt of the corresponding carboxylic acid as a catalytic agent.

STEFAN GOLDSCHMIDT.
RUDOLF R. WOLFF.